(12) United States Patent
Ok et al.

(10) Patent No.: US 7,917,868 B2
(45) Date of Patent: Mar. 29, 2011

(54) THREE-DIMENSIONAL MOTION GRAPHIC USER INTERFACE AND METHOD AND APPARATUS FOR PROVIDING THE SAME

(75) Inventors: Joon-ho Ok, Seoul (KR); Hyun-joo Kang, Seoul (KR); Sung-woo Kim, Seoul (KR); Joo-kyung Woo, Seoul (KR); Jung-bong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 621 days.

(21) Appl. No.: 11/196,449

(22) Filed: Aug. 4, 2005

(65) Prior Publication Data
US 2006/0031874 A1 Feb. 9, 2006

(30) Foreign Application Priority Data

Aug. 7, 2004 (KR) .................. 10-2004-0062250

(51) Int. Cl.
*G06F 13/00* (2006.01)
*G06F 3/048* (2006.01)
*G06F 3/00* (2006.01)
*G06T 15/00* (2006.01)

(52) U.S. Cl. ........ 715/848; 715/836; 715/782; 715/861; 715/800; 345/419

(58) Field of Classification Search .................. 715/848, 715/836, 782, 861, 800; 345/419
See application file for complete search history.

(56) References Cited

U.S. PATENT DOCUMENTS

| | | | | |
|---|---|---|---|---|
| 5,148,154 A * | 9/1992 | MacKay et al. | ............... | 715/782 |
| 5,303,388 A * | 4/1994 | Kreitman et al. | ............ | 715/836 |
| 5,515,486 A * | 5/1996 | Amro et al. | .................... | 715/848 |
| 5,602,564 A * | 2/1997 | Iwamura et al. | ............... | 715/782 |
| 5,786,820 A * | 7/1998 | Robertson | ...................... | 715/853 |
| 5,801,704 A * | 9/1998 | Oohara et al. | ................ | 715/856 |
| 5,918,232 A * | 6/1999 | Pouschine et al. | ........ | 707/103 R |
| 6,344,863 B1 | 2/2002 | Capelli et al. | | |
| 6,636,246 B1 * | 10/2003 | Gallo et al. | .................... | 715/805 |
| 2003/0081012 A1 * | 5/2003 | Chang | ........................... | 345/848 |
| 2003/0128242 A1 * | 7/2003 | Gordon | ......................... | 345/848 |
| 2004/0243593 A1 * | 12/2004 | Stolte et al. | ................... | 707/100 |

FOREIGN PATENT DOCUMENTS

JP 8-63324 A 3/1996

(Continued)

OTHER PUBLICATIONS

Westermann et al., The VSBUFFER: visibility ordering of unstructured volume primitives by polygon drawing, 1997, Visualization '97 Proceedings, p. 42.*

*Primary Examiner* — William L Bashore
*Assistant Examiner* — Jordany Núñez
(74) *Attorney, Agent, or Firm* — Sughrue Mion, PLLC

(57) ABSTRACT

A three-dimensional motion graphic user interface (MGUI) and a method and apparatus for providing the three-dimensional MGUI are provided. The three-dimensional motion graphic user interface includes a first polyhedron component that is formed of a plurality of faces, wherein at least one face of the plurality of faces that are subordinate to the first polyhedron component has predetermined attributes and displays information according to the attributes, and the first polyhedron component is separated into a plurality of second polyhedron components according to a user's action with respect to the faces.

47 Claims, 14 Drawing Sheets

FOREIGN PATENT DOCUMENTS

| | | |
|---|---|---|
| JP | 2002-175139 A | 6/2002 |
| JP | 2003-077004 A | 3/2003 |
| JP | 2003-77004 A | 3/2003 |
| KR | 2001-0044271 A | 6/2001 |
| KR | 10-2004-0022638 A | 3/2004 |
| WO | WO 01/29644 A2 | 4/2001 |

* cited by examiner

SEPERATING POLYHEDRON COMPONENT (410)

INFORMATION FACE (420)

THREE-DIMENSIONAL ICON(430)

THREE-DIMENSIONAL ICON(430)

FRONT VIEW

SIDE VIEW 2210  2220  2230

THREE-DIMENSIONAL MOTION GRAPHIC USER INTERFACE AND METHOD AND APPARATUS FOR PROVIDING THE SAME

CROSS-REFERENCE TO RELATED APPLICATION

This application claims priority from Korean Patent Application No. 10-2004-0062250 filed on Aug. 7, 2004 in the Korean Intellectual Property Office, the disclosure of which is incorporated herein by reference in its entirety.

BACKGROUND OF THE INVENTION

1. Field of the Invention

Apparatuses and methods consistent with the present invention relates to a three-dimensional motion graphic user interface (MGUI), and more particularly, to providing a user interface, in which visual effects and information use efficiency are improved by providing information to a three-dimensional user interface that changes dynamically according to a user's actions.

2. Description of the Related Art

User interfaces (UI) of conventional digital devices utilize graphic user interface (GUI) components of personal computer (PC) operating systems. As a result, most UIs have been two-dimensional, and even in the case of three-dimensional UIs, most of them are static and have features that are similar to those of conventional two-dimensional UIs.

FIG. 1 illustrates a UI using a GUI component supported in a conventional PC operating system.

Conventional UIs are two-dimensional and static. As a result, information displayed by UIs usually takes the form of text, which is non-optimal. Thus, the effectiveness with which visual information can be provided is limited. Although three-dimensional components exist among components provided by conventional GUIs, they still fall into the two-dimensional concept, and although they are viewed as three-dimensional, their advantages as three-dimensional structures are not fully utilized in their application. GUIs of PC operating systems are not suitable for all digital devices. Also, in the case of devices that provide multimedia content, conventional UIs are limited in the extent to which they can stimulate a user and provide entertainment functions. To solve the foregoing problems, various inventions (e.g., U.S. Pat. No. 6,344,863, entitled "Three-Dimensional GUI Windows with Variable-Speed Perspective Movement") have been suggested, but the problems still remain unsolved. Therefore, there is a need for a dynamic and realistic UI for digital devices that can provide a variety of content.

SUMMARY OF THE INVENTION

The present invention provides a method and apparatus for providing information that is intuitive and satisfies a user's emotions by providing a UI that uses a three-dimensional component.

The present invention also provides a method for naturally switching a screen, which prevents an interruption to a user's recognition after user's screen switching.

The present invention also reduces an error in a user's recognition by providing a natural information flow in a three-dimensional GUI environment.

The present invention also allows a user to view and control information from various angles, thereby enabling the user to understand information more clearly.

The present invention also makes it possible to display more information than conventional UIs by displaying information on faces of a separable polyhedron component and faces forming a plurality of separated components.

According to an aspect of the present invention, there is provided a three-dimensional MGUI comprising a first polyhedron component that is formed of a plurality of faces. At least one of the plurality of faces that are subordinate to the first polyhedron component has predetermined attributes. Information displayed on the faces is displayed differently according to the attributes. The first polyhedron component is separated into a plurality of second polyhedron components according to a user's action with respect to the faces.

According to another aspect of the present invention, there is provided an apparatus for providing a three-dimensional MGUI including a control module which creates a first polyhedron component that is formed of a plurality of faces, wherein at least one of the plurality of faces that are subordinate to the first polyhedron component has predetermined attributes, information displayed on the faces is displayed differently according to the attributes, and the first polyhedron component is separated into a plurality of second polyhedron components according to a user's action with respect to the faces, a storing module which stores the first polyhedron component created by the control module, an input module to which data about a user's action with respect to the first polyhedron component is input, a user interface module which assigns the attributes to at least one of a plurality of faces subordinate to the first polyhedron component, maps information displayed on a face according to the predetermined attributes, processes motion of the first polyhedron component according to data about the user's action input through the input module, changes an information display according to motion of the first polyhedron component, and manages at least one group of a plurality of first polyhedron components, and an output module which displays a processing result of the user interface module.

According to still another aspect of the present invention, there is provided a method for providing a three-dimensional MGUI, the method including a user accessing a first polyhedron component that is formed of a plurality of faces, wherein at least one of the plurality of faces that are subordinate to the first polyhedron component has predetermined attributes, information displayed on the faces is displayed differently according to the attributes, and the first polyhedron component is separated into a plurality of second polyhedron components according to a user's action with respect to the faces; the user inputting an action that generates motion of the first polyhedron component, and motion of the first polyhedron component being generated according to the action.

According to yet another aspect of the present invention, there is provided a method for providing a three-dimensional MGUI, the method including selecting a specific first polyhedron component from a group of first polyhedron components that are formed of a plurality of faces, wherein at least one of the plurality of faces that are subordinate to each of the first polyhedron components has predetermined attributes, information displayed on the faces is displayed differently according to the attributes, and each of the first polyhedron components is separated into a plurality of second polyhedron components according to a user's action with respect to the faces, highlighting the selected first polyhedron component; displaying detailed information of information displayed on a face of the selected first polyhedron component, and changing a way of displaying the other first polyhedron components of the group.

According to an additional aspect of the present invention, there is a recording medium having a computer readable program recorded therein for executing a method for providing a three-dimensional motion graphic user interface. The method includes accessing a first polyhedron compound that is formed of a plurality of faces, wherein at least one face of the plurality of faces has predetermined attributes and display information differently according to the attributes, and the first polyhedron component is separated into a plurality of second polyhedron components according to a user's action with respect to the faces; and generating a motion of the first polyhedron component according to an action which is input.

According to further aspect of the present invention, there is provided a recording medium having a computer readable program recorded therein for executing a method for providing a three-dimensional motion graphic user interface. The method includes selecting a specific first polyhedron component from a group of first polyhedron components that are formed of a plurality of faces, wherein at least one face of the plurality of faces that are subordinate to each of the first polyhedron components has predetermined attributes and displays information differently according to the attributes, and each of the first polyhedron components is separated into a plurality of second polyhedron components according to a user's action with respect to the faces; highlighting the selected first polyhedron component; displaying detailed information of the information displayed on the at least one face of the selected first polyhedron component; and changing a way of displaying the other first polyhedron components of the group.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
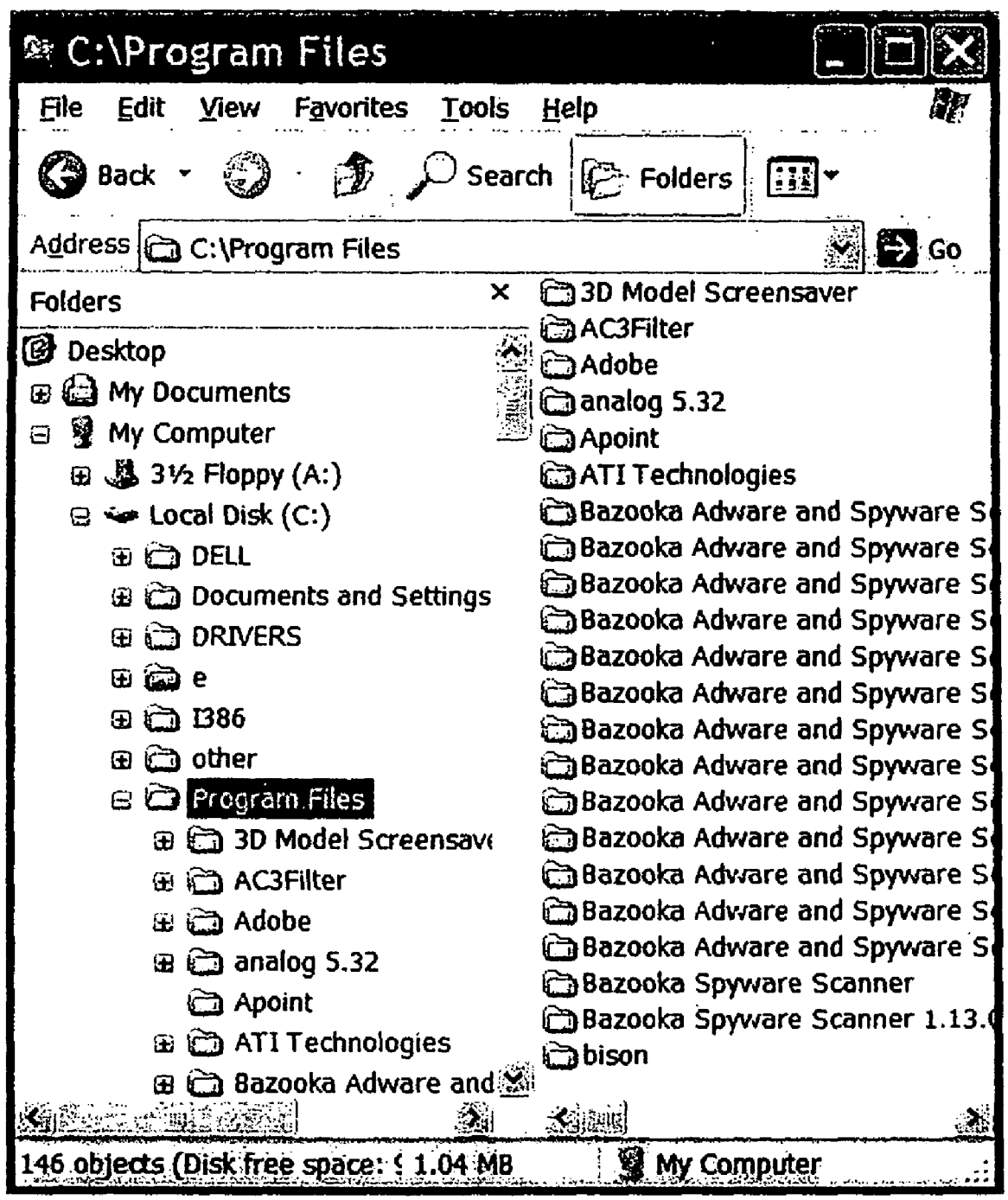
FIG. 1 illustrates a UI using a GUI component supported in a conventional PC operating system.

The present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Exemplary embodiments of the present invention will now be described in detail with reference to the accompanying drawings.

Figure 2:
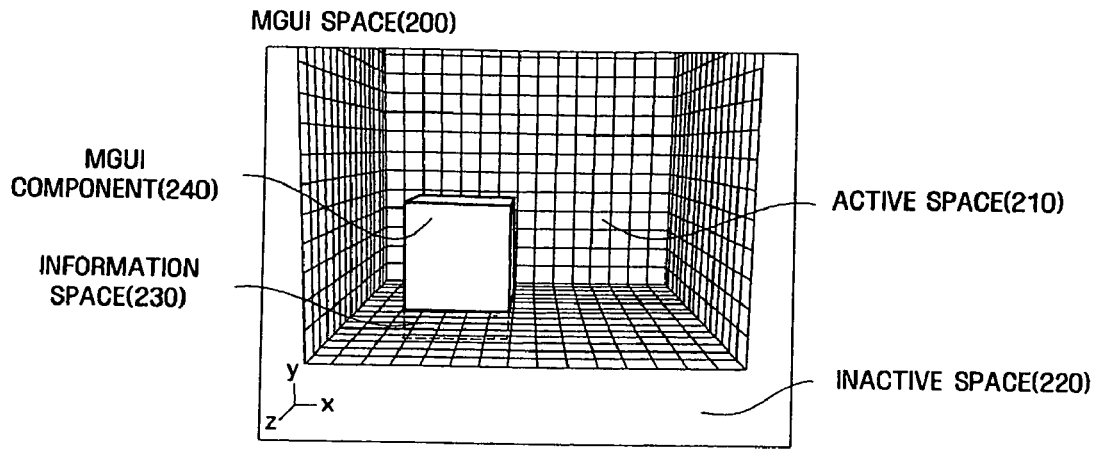
FIG. 2 illustrates the overall configuration of an MGUI according to an exemplary embodiment of the present invention.

FIG. 2 illustrates the overall configuration of an MGUI according to an exemplary embodiment of the present invention.

An MGUI is a UI capable of establishing a more dynamic GUI environment through a three-dimensional environment and motion graphics. An MGUI environment includes (1) an MGUI space, (2) MGUI components, (3) an MGUI component presentation, (4) an MGUI camera view and (5) an MGUI information face and information space.

An MGUI space 200 is a space for establishing the MGUI environment and it is divided into an active space 210 and an inactive space 220 according to the characteristics of the space. The active space 210 can be used when a UI is designed. To present an MGUI component 240 provided in the MGUI in the active space 210, an area for an information space 230 should be designated within the active space 210. In other words, the information space 230 is an area where the MGUI component 240 can be actually placed within the active space 210. Also, the information space 230 is an area secured for smooth manipulation of information and space management.

The MGUI component 240 means a configuration object of the MGUI that provides information to a user while the user is interacting with it in the MGUI environment. The MGUI component 240 includes at least one information face. The MGUI component 240, and elements of the MGUI component 240, the information face, and the information space 230 will be described in detail later with reference to FIG. 3.

Presentation of the MGUI component 240 involves determining a way to manipulate a group of at least one component in the information space 230, motion generated during the manipulation, and determining how to present the component on a screen. Presentation of the MGUI component 240 will be described in detail later with reference to FIGS. 16 through 22.

The MGUI camera view means a viewpoint in the MGUI environment. Viewpoint movement means navigation in the MGUI space 200 and motion is generated in the entire MGUI space 200. The MGUI camera view is the main cause of motion in the MGUI environment, along with inherent motion attributes of the MGUI component 240, which will be described in detail later with reference to FIG. 15.

Figure 3A:
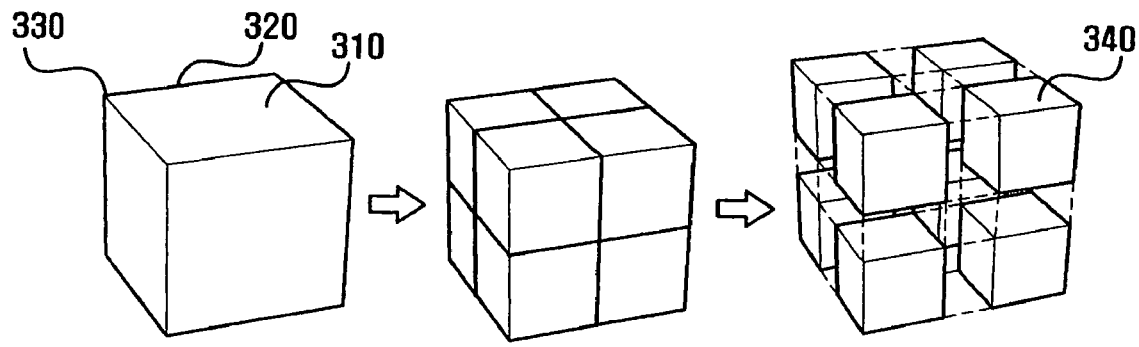
FIGS. 3A and 3B illustrate exemplary embodiments of a separable polyhedron component included in the MGUI.
Figure 3B:
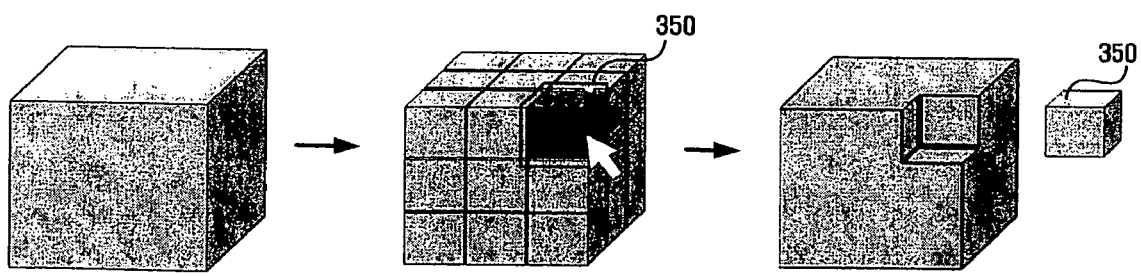

FIGS. 3A and 3B illustrate exemplary embodiments of a separable polyhedron component included in the MGUI.

The separable polyhedron component includes a plurality of faces 310, edges 320, and vertexes 330, and it can be separated into at least two polyhedron components that display information. For convenience of explanation, the separable polyhedron component will be referred to as a first polyhedron component and a polyhedron component separated from the separable polyhedron component will be referred to as a second polyhedron component. The first polyhedron component is a three-dimensional figure having at least four faces, examples of which include a tetrahedron, a pentahedron, and a hexahedron. A sphere may be assumed to be an example of a polyhedron formed of numerous faces. To facilitate explanation of the present invention, a hexahedron will be used as an example of a polyhedron.

In FIG. 3A, the first polyhedron component is separated into a set of second polyhedron components 340 assigned to a specific face selected by a user in a separation command. If a specific face of the first polyhedron component is focused on by the user, second polyhedron components assigned to the focused face are displayed and the first polyhedron component is separated into the second polyhedron components at the user's separation command. In another exemplary embodiment, the first polyhedron component may be immediately separated into the assigned second polyhedron components at the user's separation command without displaying the assigned second polyhedron components prior to separation.

As shown in FIG. 3B, if a specific face of the first polyhedron component is focused on by the user, second polyhedron components assigned to the focused face may be displayed in advance and only one second polyhedron component 350 that is selected among the displayed second polyhedron components is separated from the first polyhedron component.

Components that can be grouped into a set are three-dimensional MGUI components. The number of second polyhedron components that can be grouped into a set is larger than 2. Since a set of second polyhedron components can be assigned to each face of the first polyhedron component, a first N-polyhedron component can have a maximum of N sets of second polyhedron components. The same set of second polyhedron components may be assigned to at least two faces of the first polyhedron component. When this set of second polyhedron components is assigned to all the faces of the first polyhedron component, the first polyhedron component may be separated into these sets of second polyhedron components at all times.

The first polyhedron component has the following attributes: an identifier and a size of a first polyhedron as attributes of the first polyhedron; a number, a color, transparency, information on whether a corresponding face is an information face as attributes of a face; and an edge color as an attribute of an edge. In addition, the first polyhedron component has information about a plurality of second polyhedron components assigned to a specific face, a direction in which the plurality of second polyhedron components is to be separated, and information about the presentation and operations of the plurality of second polyhedron components that are separated from the first polyhedron component. Here, the information face means a face on which information can be displayed among a plurality of faces forming the polyhedron component. The information face will be described in detail later with reference to FIGS. 4A and 4B.

An information face of an MGUI corresponds to a window of a conventional GUI. In the MGUI, the information face is subject to the MGUI component and such subjection can be achieved in the following two manners. First, the information face can exist as a face. Second, the information face can exist as a visualized form (e.g., information face 420 of FIG. 4A) separated from the polyhedron. In other words, subjection of the information face to the MGUI component means that the information face operates in connection with the MGUI component and displays information, regardless of whether the information face forms the polyhedron component of the MGUI or takes another form separated from faces forming the polyhedron component.

Figure 4A:
FIG. 4A illustrates an exemplary embodiment in which information is mapped onto faces of the polyhedron component.
Figure 4B:
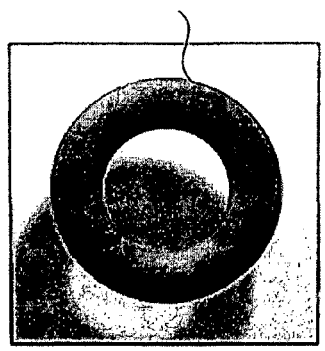
FIG. 4B illustrates a case where information mapped onto a face of the polyhedron component is three-dimensional information.
Figure 4B:

FIG. 4A illustrates a separable polyhedron component 410 (herein after simply referred to as a first polyhedron component to distinguish it from polyhedrons separated from a separable polyhedron component) of an MGUI that takes the form of a hexahedron having six faces, each of which displays information and has attributes of an information face. A square next to the first polyhedron (hexahedron) component 410 is an information face 420 visualized on a screen, like a single component. In this case, the information face 420 is displayed on a screen as a two-dimensional plane having no depth, like a window of a conventional GUI. When information displayed by the polyhedron (hexahedron) component 410 changes or the polyhedron (hexahedron) component 410 operates, information changes and operates accordingly.

Text, images, moving images, and two-dimensional widgets, which are two-dimensional visual information, can be displayed on the information face 420. Three-dimensional information such as three-dimensional icons can also be displayed on the information face 420. In this case, three-dimensional information (e.g., a three-dimensional icon) 430 can be regarded as being attached to the information face 420.

Information displayed by a polyhedron component is not limited to the number of faces forming the polyhedron component, but instead the polyhedron component can display more information than the number of faces of the polyhedron component. In an exemplary embodiment, an indicator indicating the number of sets of remaining information may be used.

If the information face is defined according to attributes of the MGUI component, the form in which information is displayed on the information face may vary according to attributes assigned to the polyhedron component. For example, the size of or amount of information displayed on the information face may change according to the size of the polyhedron component in which the information face is defined or the size of the information face.

Figure 5:
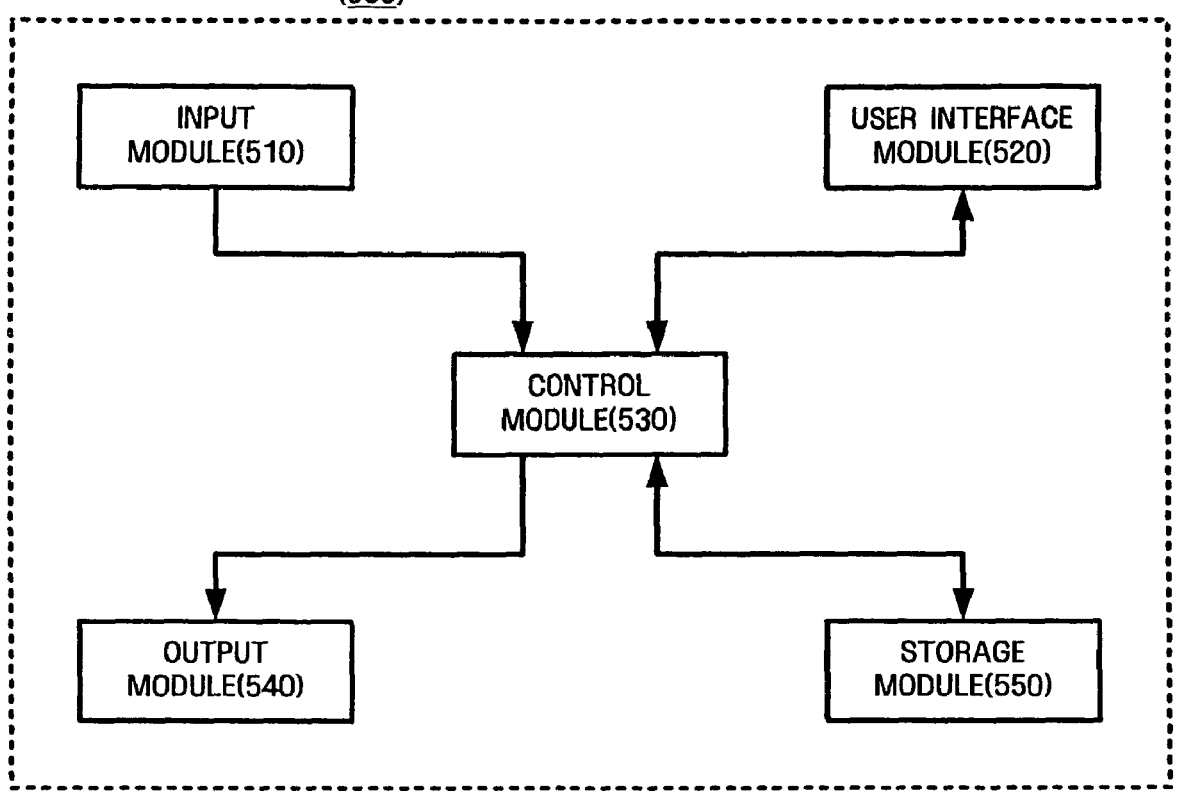
FIG. 5 is a block diagram of an apparatus for providing a three-dimensional MGUI according to the present invention.

FIG. 5 is a block diagram of an apparatus 500 for providing a three-dimensional MGUI according to the present invention.

The apparatus 500 for providing a three-dimensional MGUI may be a digital device. Here, the digital device has a digital circuit that processes digital data, examples of which include a computer, a printer, scanner, a pager, digital camera, facsimile, digital photocopier, personal digital assistant (PDA), mobile phone, digital appliance, digital telephone, digital projector, home server, digital video recorder, digital TV broadcast receiver, digital satellite broadcast receiver, and a set-top box.

The apparatus 500 for providing a three-dimensional MGUI according to the present invention includes an input module 510, a user interface module 520, a control module 530, an output module 540, and a storage module 550.

The term "module", as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they are executed one or more CPUs in a communication system.

The control module 530 creates a first polyhedron component and sets of second polyhedron components separated from the first polyhedron component, and it connects and manages different modules.

The storage module 550 stores the first polyhedron component and the second polyhedron components created by the control module 530.

Data about a user's action with respect to the first polyhedron component is input to the input module 510. The user's action includes accessing a polyhedron component, selecting a specific polyhedron component, selecting a specific information face of a polyhedron component or a specific menu on an information face, and operating a polyhedron component.

The output module 540 displays data processed by the user interface module 520 on a display device.

Figure 6:
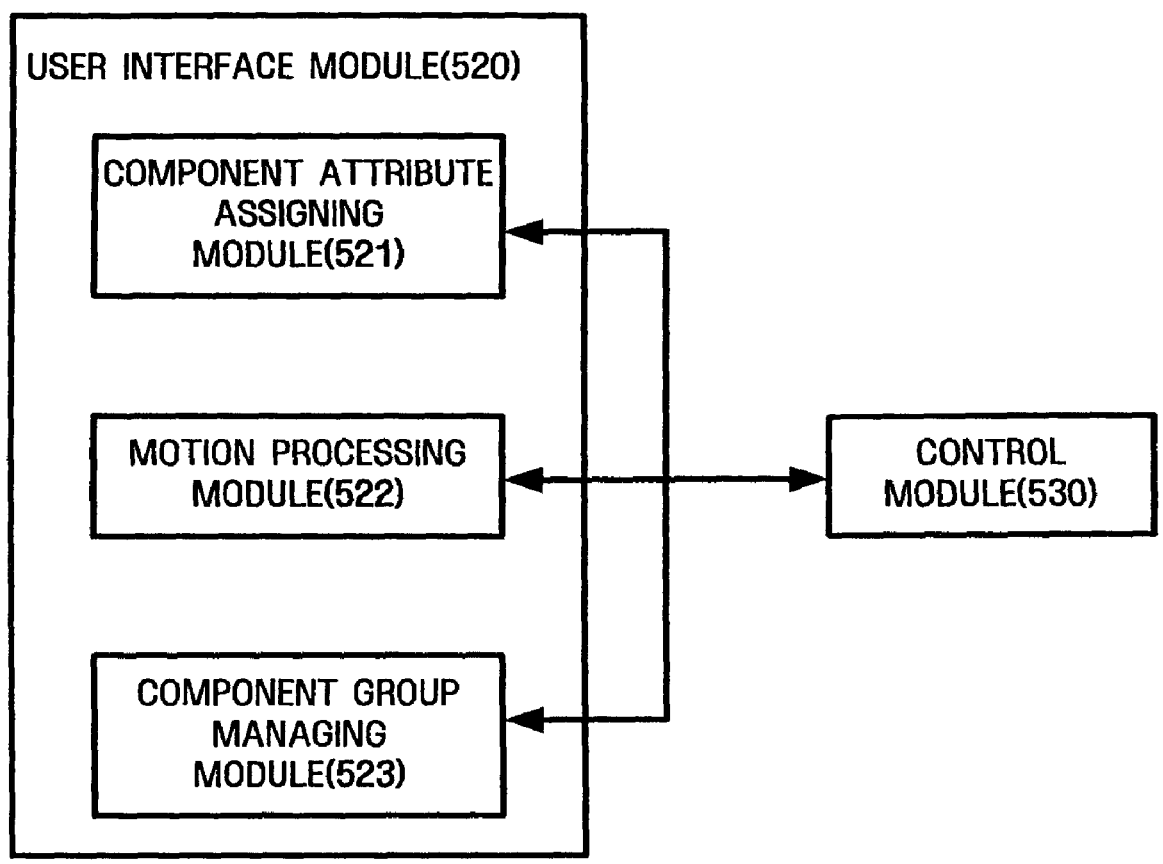
FIG. 6 is a detailed block diagram of the user interface module shown in FIG. 5.

Referring to FIG. 6, the user interface module 520 provides a user interface using the first polyhedron component created by the control module 530. The user interface module 520 includes a component attribute assigning module 521, a motion processing module 522, and a component group managing module 523.

The component attribute assigning module 521 assigns the attributes described with reference to FIG. 3 to the first polyhedron component created by the control module 530, and maps information displayed on an information face of the first polyhedron component according to the assigned attributes. Also, if the first polyhedron component is separated into a plurality of second polyhedron components assigned according to information or a menu selected by a user, information that is to be displayed by the second polyhedron components is determined and mapped.

Information displayed on an information face of the first polyhedron component and information displayed on an information face of a second polyhedron component may have a hierarchical relationship with each other. Thus, if information displayed on an information face of the first polyhedron component is upper information or brief information, information displayed on an information face of the second polyhedron component is lower information or detailed information. In another exemplary embodiment, if information displayed on an information face of the first polyhedron component is lower information or detailed information, information displayed on an information face of the second polyhedron component may be upper information or brief information. For example, if the first polyhedron component displays a movie menu, separated second polyhedron components may display a menu (search, delete, and connect) or a controller (play, stop, and pause) required to display or manipulate the movies corresponding to the displayed movie menu.

However, information displayed on an information face of the first polyhedron component and information displayed on an information face of a second polyhedron component may not be related. For example, to save information space, information that is infrequently used and is unrelated may be grouped in a first polyhedron component.

The motion processing module 522 processes the motion of a first polyhedron component in an MGUI space according to data about a user's action, which is input through the input module 510, and it maps information displayed on an information face of the first polyhedron component through the component attribute assigning module 521 according to the motion.

The component group managing module 523 receives data about a specific polyhedron component selected by a user from a group of first polyhedron components, highlights the selected polyhedron component, and modifies information mapped onto an information face of the selected polyhedron component through the component attribute assigning module 521. Also, the component group managing module 523 changes display forms of other first polyhedron components that are not selected. As such, the user interface module 520 includes modules that are divided according to their respective functions, and data about a user interface processed by the modules is managed by the control module 530, and is displayed by the output module 540.

Figure 7:
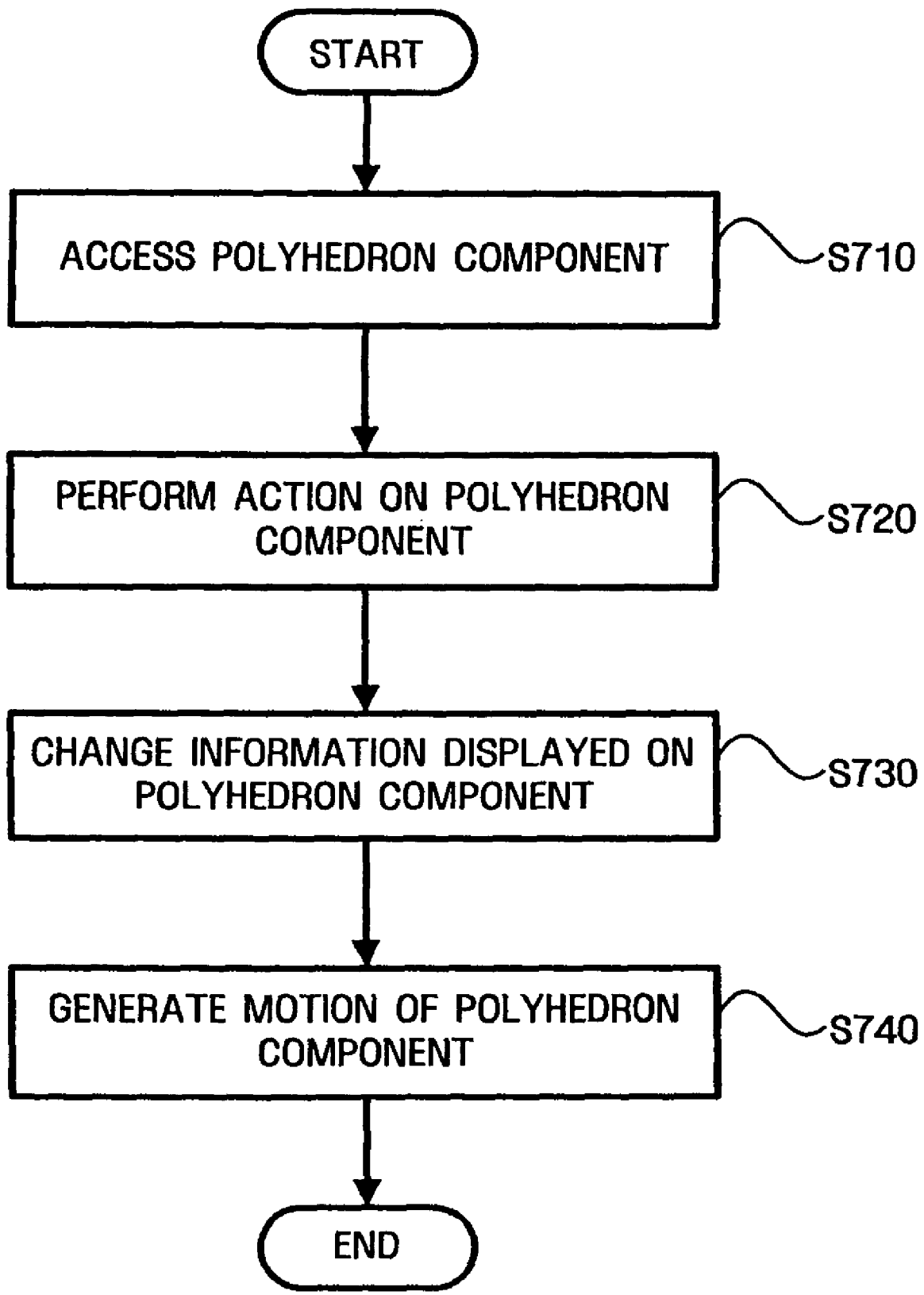
FIG. 7 is a flowchart illustrating a process of generating the motion of a polyhedron component in response to a user's action.

FIG. 7 is a flowchart illustrating a process of generating motion of a first polyhedron component in response to a user's action.

A first polyhedron component of an MGUI is a dynamic three-dimensional UI component whose motion is generated according to a user's action. A process of generating motion is as follows. A user accesses a first polyhedron component in operation S710 and performs a specific action on the first polyhedron component in operation S720. Information displayed on information faces of the first polyhedron component changes according to a user's action in operation S730, and motion of the first polyhedron component is generated in operation S740.

In another exemplary embodiment, motion of a first polyhedron component may be generated without a change in information displayed on information faces.

A user can access a first polyhedron component (operation S710) by accessing a specific polyhedron component that displays information of interest in an MGUI environment. Access can be made using various input devices such as a mouse, keyboard, keypad, or touch pad.

The user's action (operation S720) on the first polyhedron component can be performed by selecting a specific menu on an information face of the first polyhedron component, separating the first polyhedron component into a plurality of second polyhedron components assigned to a specific face of the first polyhedron component selected by the user, moving or rotating the first polyhedron component, or changing the size of the first polyhedron component to search for information. A process of displaying information by separating the first polyhedron component into a plurality of second polyhedron components will be described with reference to FIG. 8. Selection of a specific menu and movement or rotation of the polyhedron component can be performed using various input devices such as a mouse, keyboard, keypad, or touch pad. For example, selection of a specific menu can be made by clicking a selection button on a keypad, and movement or rotation of the polyhedron component can be performed using an arrow button on the keypad. In another exemplary embodiment, if a first polyhedron component whose motion is to be generated is specified, motion menus that can be selected by a user pop up on the screen and the user can perform an action on the polyhedron component by selecting a menu item corresponding to the action. The input module 510 provides data about the user's action to the user interface module 520 through the control module 530.

When a user performs an action on the first polyhedron component, information displayed on information faces of the first polyhedron component or information displayed on information faces of a second polyhedron component separated from the first polyhedron component can be changed according to the user's action. To cause such a change, the component attribute assigning module 521 of the user interface module 520 modifies information mapped to the information faces of the first polyhedron component or a second polyhedron component separated from the first polyhedron component. For example, if a user selects a specific menu on a specific information face in operation S720, the control module 530 creates a plurality of second polyhedron components assigned to the selected face or selected menu and the component attribute assigning module 521 maps information having a hierarchical relationship with the selected menu onto information faces of the second polyhedron component, and the output module 540 displays the result of the mapping.

Alternatively, all faces forming the polyhedron component may be unfolded into a plane to allow the user to recognize information on the information faces with a single glance, without changing the information on the information faces according to the user's action.

Figure 8:
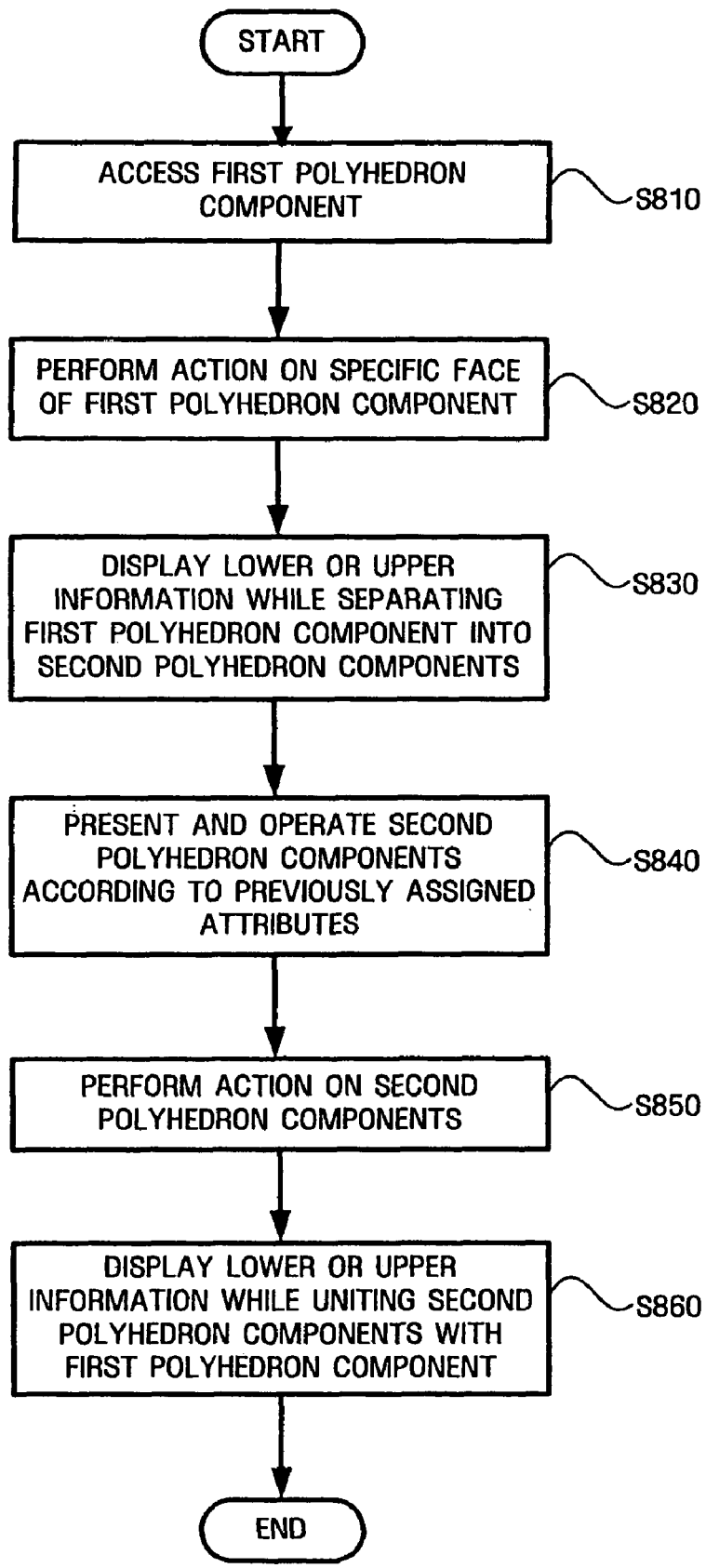
FIG. 8 is a flowchart illustrating a process of displaying information by separating a first polyhedron component.

FIG. 8 is a flowchart illustrating a process of displaying information by separating a first polyhedron component.

A user accesses a first polyhedron component in operation S810 and performs a specific action on a specific face of the first polyhedron component in operation S820. Then, in operation S830, the first polyhedron component is separated into a plurality of second polyhedron components assigned to the specific face of the first polyhedron component and each of the second polyhedron components separated from the first polyhedron component displays information that has a hierarchical relationship with information displayed on the specific face of the first polyhedron component. The second polyhedron components separated from the first polyhedron component are presented and perform operations according to predetermined attribute information in operation S840. If the user views information displayed on the second polyhedron components and performs a specific action on the second polyhedron components in operation S850, the second polyhedron components separated from the first polyhedron component are united with the original first polyhedron component, which then displays the information that was displayed before separation S860.

The user can access the first polyhedron component by accessing a specific component that displays information of interest in an MGUI environment. Access can be made using various input devices such as a mouse, keyboard, keypad, or touch pad.

The user's action (operation S820) on the specific face of the accessed first polyhedron component can be performed by selecting a specific face of the first polyhedron component that displays information of interest, a specific menu on a specific information face of the first polyhedron component, or a second polyhedron component of interest. The input module 510 provides data about the user's action to the user interface module 520 through the control module 530.

If the user selects a specific face of the first polyhedron component, a specific menu on a specific information face of the first polyhedron component, or a second polyhedron component of interest in operation S820, the first polyhedron component is separated into a plurality of second polyhedron components that have been previously assigned to the selected face or menu, or only the selected second polyhedron component is separated from the first polyhedron component and each of the second polyhedron components display information that has a hierarchical relationship with information displayed on the selected face or menu in operation S830. The presentation and operations of the second polyhedron components separated from the first polyhedron component are performed by the component group managing module 523.

The second polyhedron components may be various MGUI components, e.g., polyhedron components having at least one face that display information, openable polyhedron components having at least one opening face, or separable polyhedron components. Also, a direction in which the first polyhedron component is separated into the second polyhedron components may be previously determined as one of attributes of the first polyhedron component.

Detailed processes of separation of the first polyhedron component (operation 830), and the presentation and operations of the second polyhedron components (operation 840) are as follows. If the data about the user's action with respect to the specific face of the first polyhedron component is provided to the user interface module 520 through the input module 510 and the control module 530, the component attribute assigning module 521 assigns attributes to the second polyhedron components and maps information that is to be displayed on the second polyhedron components according to the assigned attributes after separation of the first polyhedron component. The motion processing module 522 processes the separation of the first polyhedron component according to a user's action and operations of the second polyhedron components according to the assigned attributes after separation of the first polyhedron component.

The user may perform an action (operation S850) on the second polyhedron components by directly issuing a command to the second polyhedron components or by moving the second polyhedron components closer to one another (or by moving the second polyhedron components close to the user).

In the case of first polyhedron components having a hierarchical structure, unification (operation S860) of the second polyhedron components is consecutively performed from lower to upper first polyhedron components. In other words, if the user issues a unification command to an upper first polyhedron component, all the lower first polyhedron components of the upper first polyhedron component are first united or opening faces of all the lower openable polyhedron components of the upper first polyhedron component are first closed and then all the lower openable polyhedron components of the upper first polyhedron component are incorporated into their respective upper separable polyhedron components.

Motion of the first polyhedron component includes a position change, a size change, rotation, spring lock, and separation into a plurality of second polyhedron components. Here, a reference face for the motion may be a front face of the first polyhedron component or a face that is opposite to the user. In another exemplary embodiment, the user may select a motion reference face using various input devices. In still another exemplary embodiment, a pointer is placed on a motion reference face and the user may select the motion reference face by moving the pointer. Each type of motion will be described with reference to FIGS. 9 through 15.

Figure 9:
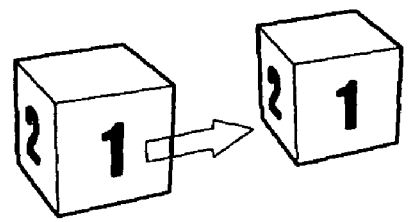
FIG. 9 illustrates an exemplary embodiment in which the position of the first polyhedron component changes during motion of the first polyhedron component.

FIG. 9 illustrates an exemplary embodiment in which the position of the first polyhedron component is changed.

After a user selects a specific first polyhedron component, the user designates a corresponding position to which the selected first polyhedron component is to be moved using an input device (various types of input devices can be used), thereby moving the selected first polyhedron component to the designated position. For example, when a mouse is used as the input device, the user selects a desired first polyhedron component by clicking the first polyhedron component using the mouse and drags the clicked first polyhedron component to a desired position.

Figure 10:
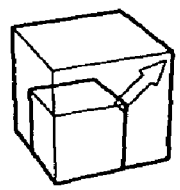
FIG. 10 illustrates an exemplary embodiment in which the size of the first polyhedron component changes during motion of the first polyhedron component.

FIG. 10 illustrates an exemplary embodiment in which the size of the first polyhedron component is changed.

A user selects a first polyhedron component whose size is to be reduced or enlarged and (s)he changes the size of the first polyhedron component. For example, when a mouse is used as the input device, the size of the first polyhedron component can be reduced or enlarged by selecting and dragging a vertex of the first polyhedron component.

Figure 11:
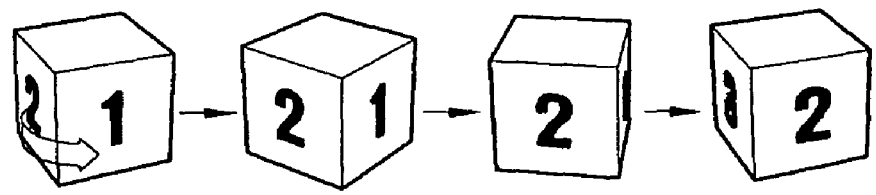
FIG. 11 illustrates an exemplary embodiment in which the first polyhedron component rotates during its motion.

FIG. 11 illustrates an exemplary embodiment in which the first polyhedron component is rotated.

In FIG. 11, a hexahedron is rotated to the right (in the positive x-axis direction). However, the polyhedron component may rotate an arbitrary angle in an arbitrary direction.

Figure 12:
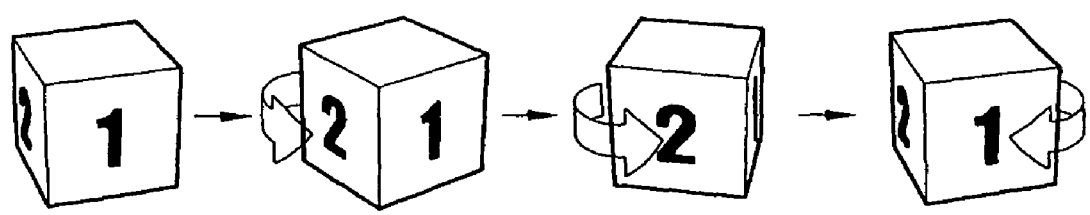
FIG. 12 illustrates an exemplary embodiment in which the first polyhedron component is spring-locked during its motion.

FIG. 12 illustrates an exemplary embodiment in which the first polyhedron component is spring-locked.

Spring-lock means the polyhedron component rotates by a desired angle in a predetermined direction according to a user's action and returns to its original state if the user ceases the rotation. In another exemplary embodiment, the polyhedron component may remain in a rotated state and then return to its original state upon user manipulation.

Figure 13:
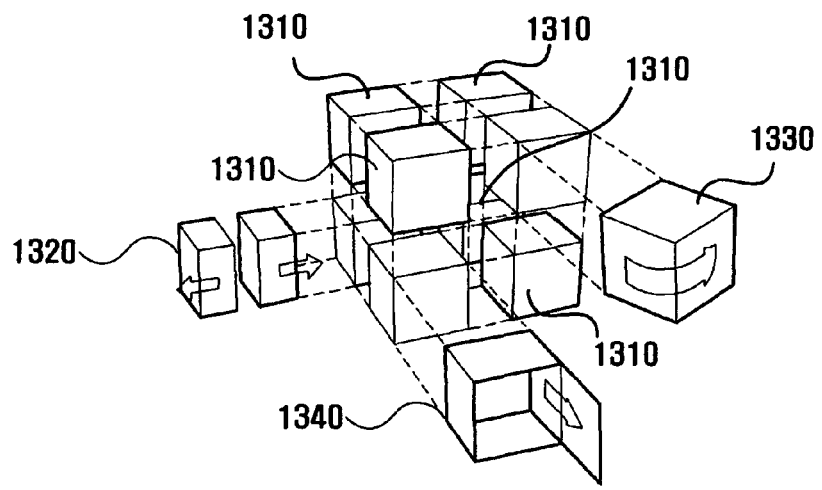
FIGS. 13 and 14 illustrate an exemplary embodiment in which information is displayed by separating the first polyhedron component into at least two second polyhedron components during motion of the first polyhedron component.
Figure 14:
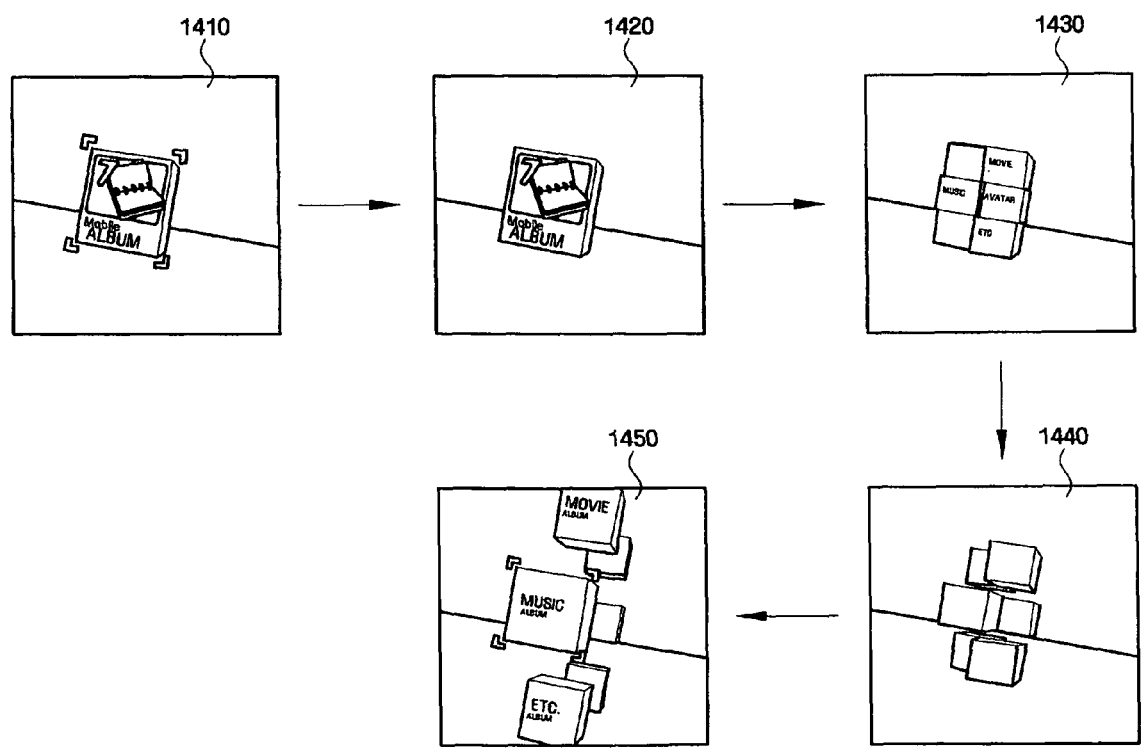

FIGS. 13 and 14 illustrate an exemplary embodiment in which information is displayed by separating the first polyhedron component multiple second polyhedron components.

In FIG. 13, a separable polyhedron component is separated into a plurality of second polyhedron components, i.e., six polyhedron components 1310 and 1330, one separable polyhedron component 1320, and one openable polyhedron component 1340 in a predetermined direction. Each of the second polyhedron components displays corresponding information on a face designated as an information face. The lower polyhedron components 1310 and 1330 of the separable polyhedron component may be moving according to a user's action while displaying corresponding information. The lower separable polyhedron component 1320 of the separable polyhedron component may be separated again into a plurality of third polyhedron components according to a user's action. An opening face of the lower openable polyhedron component 1340 of the separable polyhedron component may be opened according to a user's action and the user may view information objects contained in the internal space of the lower openable polyhedron component 1340.

FIG. 14 illustrates an exemplary embodiment of a cellular phone user interface that uses a separable polyhedron component.

In FIG. 14, a separable polyhedron component is separated into second polyhedron components that display sub menus. When a first polyhedron component (1410) displaying a menu "Mobile Album" (1420) is separated into six second polyhedron components (1420), sub menus "Photo Album", "Movie Album", and "Music Album" of the menu "Mobile Album" are displayed (1430). The second polyhedron components are arranged (1440) and presented (1450) according to previously assigned attributes.

As described above, motion of the separable polyhedron component is generated by a user's direct action, but it may also be generated by a change in the MGUI space (a change in division type of the MGUI space or a space reduction or enlargement) or a change in the camera view which is a viewpoint in the MGUI space.

Figure 15:
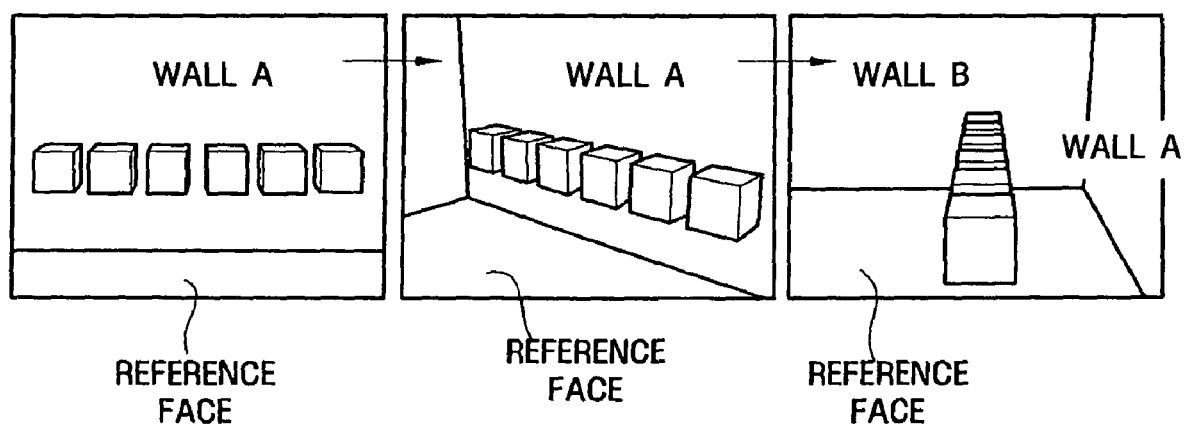
FIG. 15 illustrates an exemplary embodiment in which motion of the first polyhedron component is generated according to changes in a camera view.

In FIG. 15, as a camera view rotates to the left, all the first polyhedron components in the MGUI space rotate to the right. In addition, when the camera view is zoomed out, all the first polyhedron components in the MGUI space can be reduced in size. When the camera view is zoomed in, all the first polyhedron components in the MGUI space can be enlarged.

The MGUI may include a plurality of first polyhedron components. By managing a plurality of polyhedron components as a group, it is possible to give unity to presentation or movement in a UI and provide a user with a UI that allows efficient information searching.

Figure 16:
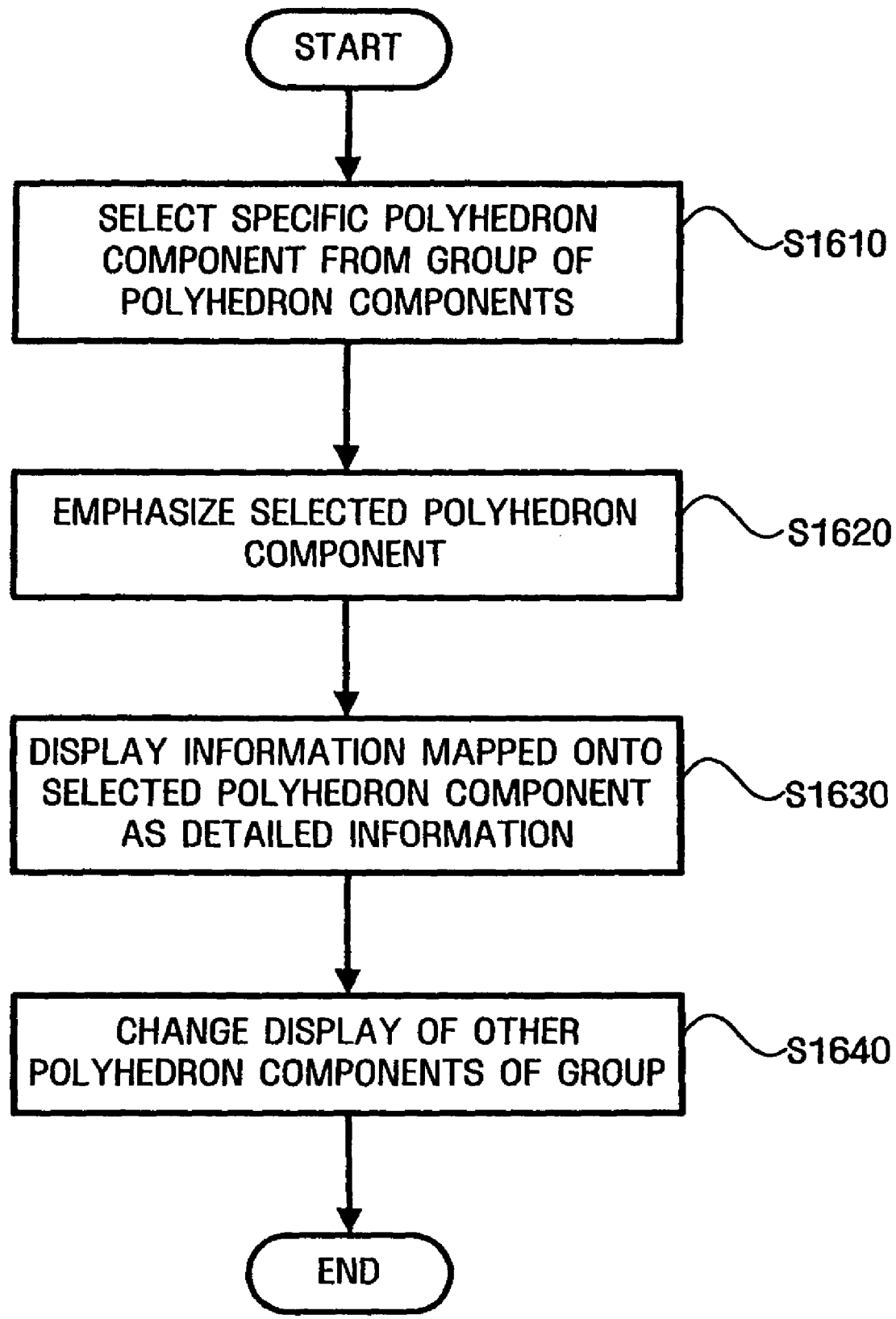
FIG. 16 is a flowchart illustrating a process of displaying information by a user interface that is comprised of a plurality of first polyhedron components.

FIG. 16 is a flowchart illustrating a process of displaying information by a user interface that is comprised of a plurality of first polyhedron components.

If the user selects a specific first polyhedron component from a group of first polyhedron components in operation S1610, the selected first polyhedron component is highlighted in operation S1620. Detailed information of information mapped onto an information face of the selected component may be displayed in operation S1630. The other first polyhedron components of the group are displayed differently from the selected first polyhedron component in operation S1640.

User's selection of a specific polyhedron component from a group of polyhedron components (operation S1610) can be made by accessing and selecting the specific polyhedron component using an input device such as a mouse, keyboard, keypad, or touch pad. If the user selects a specific polyhedron component using an input device, the input module 510 transfers information about the user's selection to the component group managing module 523 of the user interface module 520 through the control module 530.

After completion of user selection, the selected polyhedron component is emphasized in operation S1620. Such an emphasis may be made by enlarging the selected polyhedron component or moving the selected polyhedron component close to the user (along the z-axis). In another exemplary embodiment, the emphasis can be accomplished by changing the color of the selected polyhedron component, or by marking the edges of the selected polyhedron component with bold lines. In still another exemplary embodiment, the selected polyhedron component may be marked with a focus or other marks. If a specific polyhedron component is selected, an information face of the selected polyhedron component may display more detailed information than the information mapped by the component attribute assigning module 521 in operation S1630. Alternatively, the selected polyhedron component can be emphasized by reducing the size of the other polyhedron components in the group, moving the other polyhedron components away from the user, or fading the colors of the other polyhedron components. Display continuity is implemented in operation S1640, which is performed by the component group managing module 523 and the component attribute assigning module 521.

FIGS. 17 through 22 illustrate exemplary embodiments in which groups of first polyhedron components (shown in FIG. 16) are presented.

Figure 17:
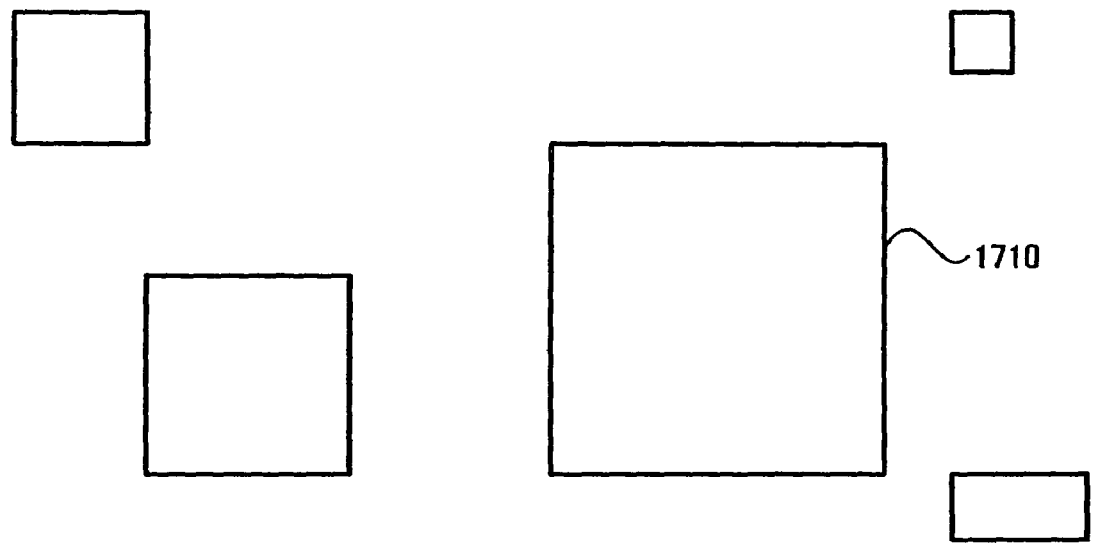
FIGS. 17 through 22 illustrate an exemplary embodiments in which groups of first polyhedron components are presented.

FIG. 17 illustrates a presentation in which changes are made to the sizes of the first polyhedron components to allow a user to intuitively recognize information of importance or unimportance.

Specifically, FIG. 17 shows a presentation in which changes are made to the display sizes of the first polyhedron components to allow a user to intuitively recognize information of importance or unimportance. In other words, information of a polyhedron component that is closer to the user (along the z-axis) is more important, and information of the polyhedron component that is farther away from the user in the (along the z-axis) is less important. Thus, if a polyhedron component that is away from the user is pulled forward, it can be enlarged. If a polyhedron component that is close to the user is pushed backward, it can be reduced in size. At this time, when a selected polyhedron component 1710 is enlarged, neighboring first polyhedron components that may collide with the enlarged polyhedron component are reduced in size. Also, if a specific first polyhedron component is selected, it can be enlarged. Selection of a polyhedron component can be made by moving a focus or horizontally or vertically moving components while fixing a focus.

Figure 18:
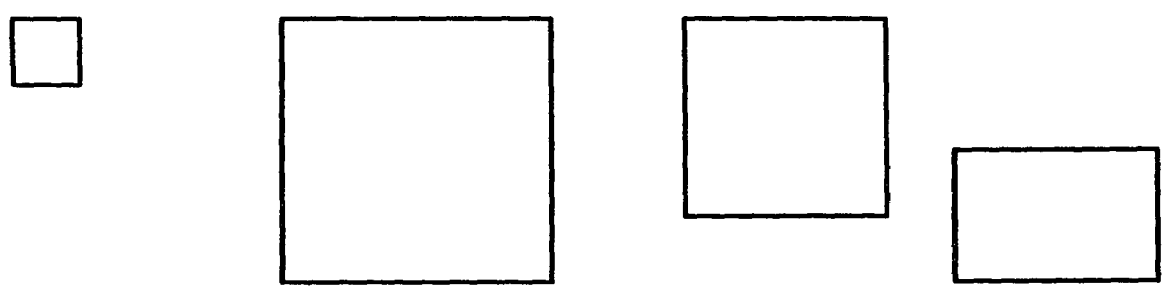

FIG. 18 illustrates a presentation in which only a selected first polyhedron component 1810 is enlarged, and other first polyhedron components are displayed gradually smaller to show the natural connection between information. In such a presentation, a plurality of first polyhedron components can be connected in the form of a curved line as shown in FIG. 18. In another exemplary embodiment, a plurality of polyhedron components can be connected in the form of a circle or a straight line. Selection of a polyhedron component can be made by moving a focus or horizontally or vertically moving components while fixing a focus.

Figure 19:
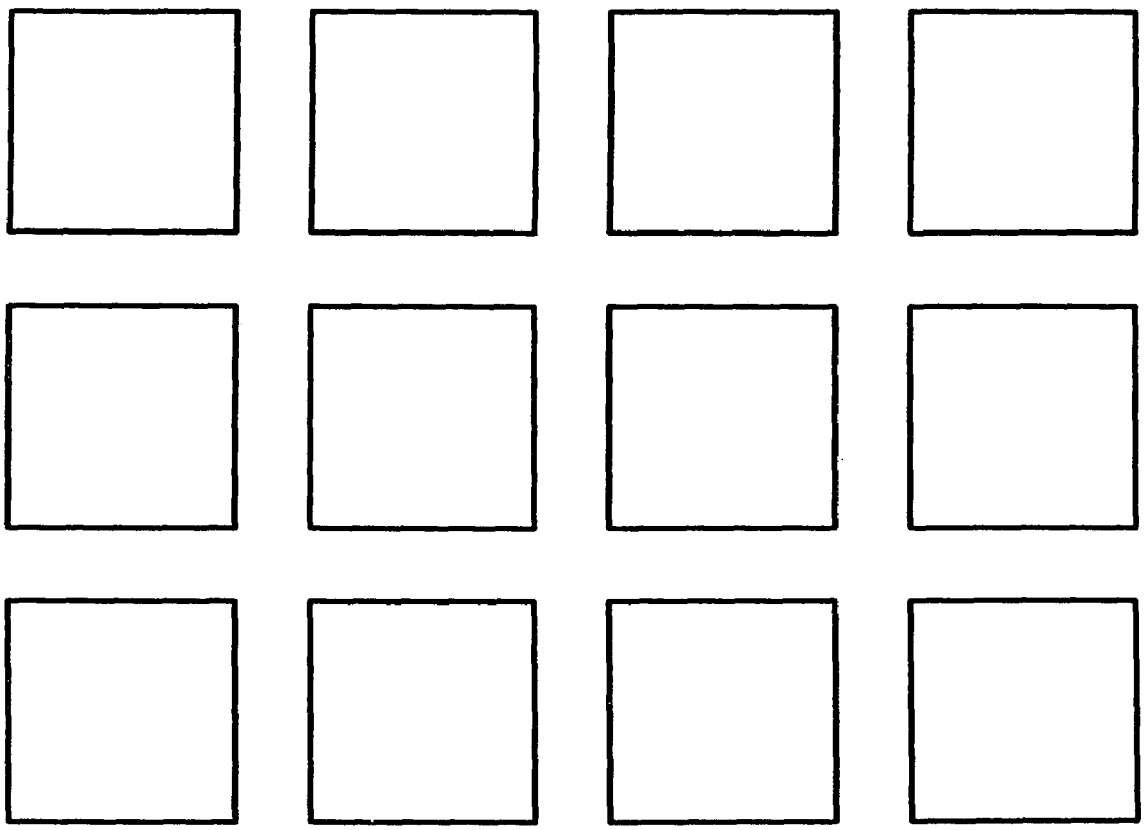

FIG. 19 illustrates a presentation in which first polyhedron components of the same size are arranged in the form of a lattice, and a selected first polyhedron component is enlarged to a full screen. Such presentation distributes information to briefly show a large amount of information. If a user selects a desired component for more detail information, the selected component is enlarged.

Figure 20:
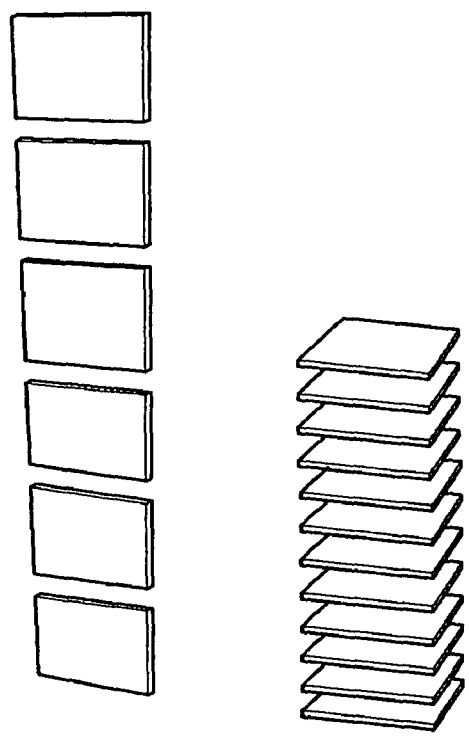

FIG. 20 illustrates a presentation in which various first polyhedron components of the same size on which information is displayed are stacked or distributed in a linear fashion. Thus, a presentation like that shown in FIG. 20 allows a user to efficiently search for information by one-way viewing. If the user moves polyhedron components vertically using an input device and selects a specific component, a space is created above the selected polyhedron component to display more detailed information. Selection of a component can be made by moving a user focus or horizontally or vertically moving components while fixing a user focus.

Figure 21:
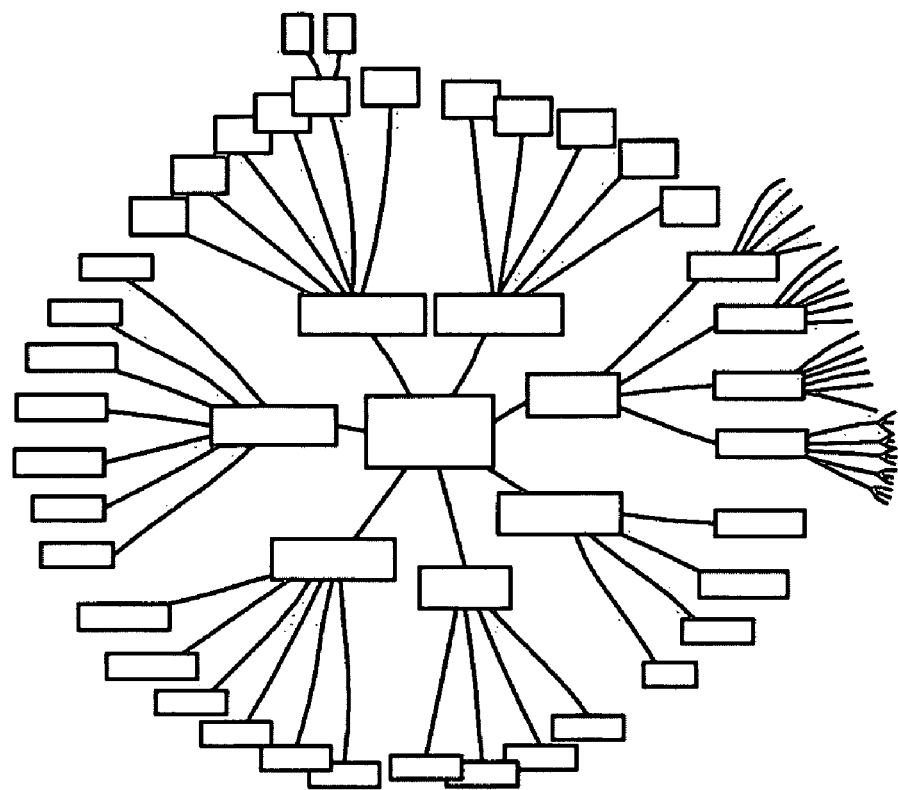

FIG. 21 illustrates a presentation in which a plurality of first polyhedron components is arranged in a radial form to allow a user to recognize a tree structure of information with a single glance. If the user selects a component on which information of interest is displayed, the selected component is enlarged and related information is displayed. At this time, neighboring components that are not selected are reduced in size or are moved away from the user.

Figure 22:
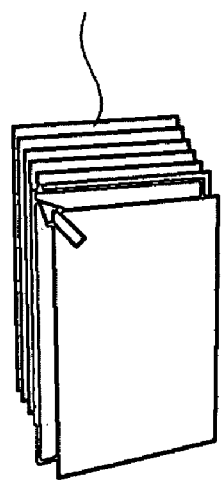
Figure 22:
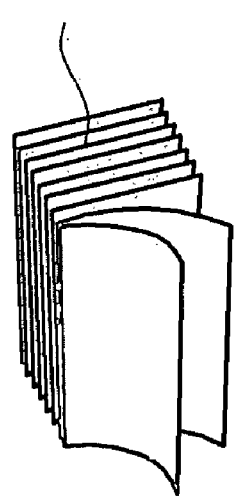
Figure 22:
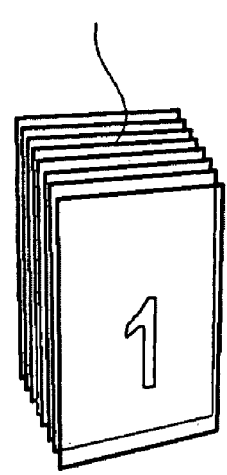

FIG. 22 illustrates a presentation in which information faces displaying a large amount of information overlap, information of a currently selected component is positioned at the front, and other information which is not important is positioned behind the selected component. Also, the user can take out one of the overlapped information faces in the following manners.

First, an information face designated by the user is slid out (2210); the direction of sliding, a point of time and a position at which sliding is stopped can be set when the UI is designed. Second, like turning the pages of a book, all the information faces in front of an information face designated by a user are flipped (2220) in order to display the designated information face. Third, all the information faces in front of the designated information face are made transparent (2230).

The information providing method and apparatus of the present invention provides at least the following advantages.

First, information is provided in an intuitive and stimulating manner through a UI that uses three-dimensional components.

Second, a method is provided for naturally switching to a screen that prevents interruption to a user's recognition.

Third, natural information flow is obtained and an error in a user's recognition is reduced by using motion of a polyhedron component or by presenting groups of components in various ways.

Fourth, since users can view and control information from various angles, they can understand the information more easily.

Fifth, it is possible to display more information than conventional UIs by displaying information on faces of a polyhedron component.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for providing a three-dimensional motion graphic user interface, the apparatus comprising:
   a processor which controls the operation of a three-dimensional motion graphic user interface, the user interface comprising:
   a first polyhedron component that is formed of a plurality of faces, wherein at least one face of the plurality of faces of the first polyhedron component has predetermined attributes and displays information according to the attributes, and the first polyhedron component is separated into a plurality of second polyhedron components according to a user's action with respect to the faces,
   wherein each of the second polyhedron components encloses a volume that is different from a volume enclosed by the first polyhedron component; and
   wherein each of the plurality of second polyhedron components is formed of a plurality of faces, at least one face of the plurality of faces of the second polyhedron component displays information, and information is not displayed in an inner space of the second polyhedron component defined by the plurality of faces of the second polyhedron component;
   wherein when the plurality of second polyhedron components is created, the first polyhedron component changes into the plurality of second polyhedron components and the first polyhedron component is removed.

2. The apparatus of claim 1, wherein the information displayed on the at least one face of the first polyhedron component and information displayed on the plurality of second polyhedron components have a hierarchical relationship with each other.

3. The apparatus of claim 1, wherein the attributes include at least one of a size of the first polyhedron component, colors of the faces of the first polyhedron component, transparency of the faces of the first polyhedron component, information on whether a face is an information face, information about the plurality of second polyhedron components assigned to the faces, information about a presentation and operations of the second polyhedron components, a direction in which the first polyhedron component is separated into the plurality of second polyhedron components, and colors of edges of the first polyhedron component.

4. The apparatus of claim 1, wherein the at least one face is separated from the first polyhedron component and the information is displayed on the separated face.

5. The apparatus of claim 1, wherein the information is displayed differently according to a viewpoint with respect to the first polyhedron component in an active space.

6. The apparatus of claim 1, wherein the information is displayed three-dimensionally.

7. The apparatus of claim 1, wherein the plurality of second polyhedron components are united with the first polyhedron component according to a user's action.

8. The apparatus of claim 1, wherein the plurality of second polyhedron components are assigned differently according to a face of the first polyhedron component on which the user's action is performed.

9. The apparatus of claim 1, wherein the plurality of second polyhedron components are separated into a plurality of third polyhedron components according to a user's action with respect to the faces that constitute the plurality of second polyhedron components.

10. The apparatus of claim 1, wherein at least one of the faces of the plurality of second polyhedron components is an opening face.

11. The apparatus of claim 1, wherein each of the plurality of second polyhedron components is presented and operates according to attributes that are assigned to each of the second polyhedron components.

12. The apparatus of claim 1, wherein a position of the first polyhedron component is changed according to a user's action.

13. The apparatus of claim 1, wherein a size of the first polyhedron component is changed according to a user's action.

14. The apparatus of claim 1, wherein the first polyhedron component rotates with respect to at least one axis according to a user's action.

15. The apparatus of claim 1, wherein the first polyhedron component rotates with respect to at least one axis according to a user's action and then returns to its original state.

16. The apparatus of claim 1, wherein if some of a plurality of first polyhedron components are grouped, the first polyhedron components which are grouped have at least one identical attribute.

17. An apparatus for providing a three-dimensional motion graphic user interface, the apparatus comprising:
a control module which creates a first polyhedron component formed of a plurality of faces, wherein at least one face of the plurality of faces has predetermined attributes and displays information differently according to the attributes, the first polyhedron component is separated into a plurality of second polyhedron components according to a user's action with respect to the faces, and each of the second polyhedron components encloses a volume that is different from a volume enclosed by the first polyhedron component, and each of the plurality of second polyhedron components is formed of a plurality of faces, at least one face of the plurality of faces of the second polyhedron component displays information, and information is not displayed in an inner space of the second polyhedron component defined by the plurality of faces of the second polyhedron component;
a storage module which stores the first polyhedron component created by the control module;
an input module to which data about a user's action with respect to the first polyhedron component is input;
a user interface module which assigns the attributes to the at least one face, maps information displayed on the at least one face according to the predetermined attributes, processes motion of the first polyhedron component according to the data about the user's action input through the input module, and changes an information display according to motion of the first polyhedron component; and
an output module which displays a processing result of the user interface module,
wherein when the plurality of second polyhedron components is created, the first polyhedron component changes into the plurality of second polyhedron components and the first polyhedron component is removed.

18. The apparatus of claim 17, wherein the information displayed on the at least one face of the first polyhedron component and information displayed on the plurality of second polyhedron components have a hierarchical relationship with each other.

19. The apparatus of claim 17, wherein the attributes include at least one of a size of the first polyhedron component, colors of the faces of the first polyhedron component, transparency of the faces of the first polyhedron component, information on whether a face is an information face, information about the plurality of second polyhedron components assigned to the faces, information about a presentation and operations of the second polyhedron components, a direction in which the first polyhedron component is separated into the plurality of second polyhedron components, and colors of edges of the first polyhedron component.

20. The apparatus of claim 17, wherein the at least one face is separated from the first polyhedron component and the information is displayed on the separated face.

21. The apparatus of claim 17, wherein the information is displayed differently according to a viewpoint with respect to the first polyhedron component in an active space.

22. The apparatus of claim 17, wherein the information is displayed three-dimensionally.

23. The apparatus of claim 17, wherein the plurality of second polyhedron components are united with the first polyhedron component according to a user's action.

24. The apparatus of claim 17, wherein the plurality of second polyhedron components are assigned differently according to a face of the first polyhedron component on which the user's action is performed.

25. The apparatus of claim 17, wherein the plurality of second polyhedron components are separated into a plurality of third polyhedron components according to a user's action with respect to the faces that constitute the plurality of second polyhedron components.

26. The apparatus of claim 17, wherein at least one of the faces that constitute the plurality of second polyhedron components is an opening face.

27. The apparatus of claim 17, wherein each of the plurality of second polyhedron components is presented and operates according to attributes that are assigned to each of the second polyhedron components.

28. The apparatus of claim 17, wherein the motion of the first polyhedron component includes changing a position of the first polyhedron component.

29. The apparatus of claim 17, wherein the motion of the first polyhedron component includes changing a size of the first polyhedron component.

30. The apparatus of claim 17, wherein the motion of the first polyhedron component includes rotating the first polyhedron component with respect to at least one axis according to a user's action.

31. The apparatus of claim 17, wherein the motion of the first polyhedron component includes rotating the first polyhedron component with respect to at least one axis according to a user's action and then returning the first polyhedron component to its original state.

32. The apparatus of claim 17, wherein the user interface module manages at least one group of a plurality of first polyhedron components.

33. The apparatus of claim 32, wherein the group of the first polyhedron components is managed by causing the first polyhedron components included in the group to have at least one identical attribute.

34. A method for providing a three-dimensional motion graphic user interface, the method comprising:
    accessing a first polyhedron component that is formed of a plurality of faces, wherein at least one of the plurality of faces has predetermined attributes and displays information differently according to the attributes, the first polyhedron component is separated into a plurality of second polyhedron components according to a user's action with respect to the faces, each of the second polyhedron components encloses a volume that is different from a volume enclosed by the first polyhedron component, and each of the plurality of second polyhedron components is formed of a plurality of faces, at least one face of the plurality of faces of the second polyhedron component displayed information, and information is not displayed in an inner space of the second polyhedron component defined by the plurality of faces of the second polyhedron component; and
    generating a motion of the first polyhedron component according to an action which is input,
    wherein when the plurality of second polyhedron components is created, the first polyhedron component changes into the plurality of second polyhedron components and the first polyhedron component is removed.

35. The method of claim 34, wherein the information displayed on the at least one face of the first polyhedron component and information displayed on the plurality of second polyhedron components have a hierarchical relationship with each other.

36. The method of claim 34, wherein the attributes include at least one of a size of the first polyhedron component, colors of the faces of the first polyhedron component, transparency of the faces of the first polyhedron component, information on whether a face is an information face, information about the plurality of second polyhedron components assigned to the faces, information about a presentation and operations of the second polyhedron components, a direction in which the first polyhedron component is separated into the plurality of second polyhedron components, and colors of edges of the first polyhedron component.

37. The method of claim 34, wherein the generating the motion of the first polyhedron component comprises:
    separating the first polyhedron component into the plurality of second polyhedron components assigned to a face on which a user's action is performed; and
    presenting and operating each of the plurality of second polyhedron components according to previously assigned attributes after the separating the first polyhedron component.

38. The method of claim 37, further comprising uniting the plurality of second polyhedron components into the first polyhedron component according to a user's action.

39. The method of claim 34, wherein the motion changes a position of the first polyhedron component.

40. The method of claim 34, wherein the motion changes a size of the first polyhedron component.

41. The method of claim 34, wherein the motion rotates the first polyhedron component with respect to at least one axis according to a user's action.

42. The method of claim 34, wherein the motion rotates the first polyhedron component with respect to at least one axis according to a user's action and then returns the first polyhedron component to its original state.

43. A method for providing a three-dimensional motion graphic user interface, the method comprising:
    selecting a specific first polyhedron component from a group of first polyhedron components that are formed of a plurality of faces, wherein at least one face of the plurality of faces has predetermined attributes and displays information differently according to the attributes, each of the first polyhedron components is separated into a plurality of second polyhedron components according to a user's action with respect to the faces, and each of the second polyhedron components according to a user's action with respect to the faces, and each of the second polyhedron components encloses a volume that is different from volume enclosed by the first polyhedron component, and each of the plurality of second polyhedron components is formed of a plurality of faces, at least one face of the plurality of faces of the second polyhedron component displays information, and information is not displayed in an inner space of the second polyhedron component defined by the plurality of faces of the second polyhedron component;
    highlighting the selected first polyhedron component;
    displaying detailed information of the information displayed on the at least one face of the selected first polyhedron component; and
    changing a way of displaying the other first polyhedron components of the group,
    wherein when the plurality of second polyhedron components is created, the first polyhedron component changes into the plurality of second polyhedron components and the first polyhedron component is removed.

44. The method of claim 43, wherein if one of the first polyhedron components of the group is moved, the other polyhedron components of the group are also moved consecutively.

45. The method of claim 43, wherein the highlighting the selected first polyhedron component comprises moving the selected first polyhedron component close to a user, enlarging the selected first polyhedron component, changing a color of the selected first polyhedron component, marking edges of the selected first polyhedron component with bold lines, or marking the selected first polyhedron component with a focus mark.

46. The method of claim 43, wherein the changing the way of displaying the other first polyhedron components comprises moving the other first polyhedron components away from a user, reducing sizes of the other first polyhedron components, thinning colors of the other first polyhedron components, or marking edges of the other first polyhedron components with thin lines.

47. The method of claim 43, wherein the first polyhedron components in the group are arranged in the form of a tree structure, and if the selected first polyhedron component is enlarged, related information is displayed in the form of a tree structure.

* * * * *